United States Patent [19]

Woerner

[11] 4,154,868

[45] May 15, 1979

[54] METHOD FOR FORMING TARGETS

[75] Inventor: Robert L. Woerner, Livermore, Calif.

[73] Assignee: The United States of America as represented by the United States Department of Energy, Washington, D.C.

[21] Appl. No.: 924,335

[22] Filed: Jul. 13, 1978

[51] Int. Cl.$^2$ .................................................. G21B 1/00
[52] U.S. Cl. ...................................... 427/6; 427/237; 427/53; 427/5; 176/1; 118/49.1
[58] Field of Search .................... 176/1; 427/6, 5, 237, 427/53

[56] References Cited

PUBLICATIONS

Miller — APS 18th Annual Meeting of the Plasma Physics Division of the APS, Nov. 15–19, 1976.

*Primary Examiner*—Sam Silverberg
*Attorney, Agent, or Firm*—Dean E. Carlson; Roger S. Gaither; L. E. Carnahan

[57] ABSTRACT

Method for cryoinduced uniform deposition of cryogenic materials, such as deuterium-tritium (DT) mixtures, on the inner surface of hollow spherical members, such as inertially imploded targets. By vaporizing and quickly refreezing cryogenic materials contained within a hollow spherical member, a uniform layer of the materials is formed on the inner surface of the spherical member. Heating of the cryogenic material, located within a non-isothermal compact freezing cell, is accomplished by an electrical heat pulse, whereafter the material is quickly frozen forming a uniform layer on the inner surface of the spherical member. The method is not restricted to producing a frozen layer on only the inner surface of the innermost hollow member, but where multiple concentric hollow spheres are involved, such as in multiple shell targets for lasers, electron beams, etc., layers of cryogenic material may also be formed on the inner surface of intermediate or outer spherical members, thus providing the capability of forming targets having multiple concentric layers or shells of frozen DT.

7 Claims, 8 Drawing Figures

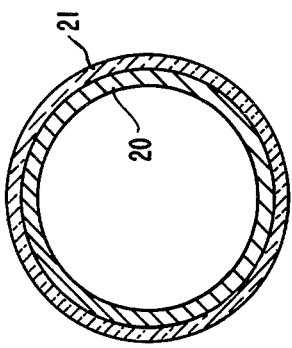
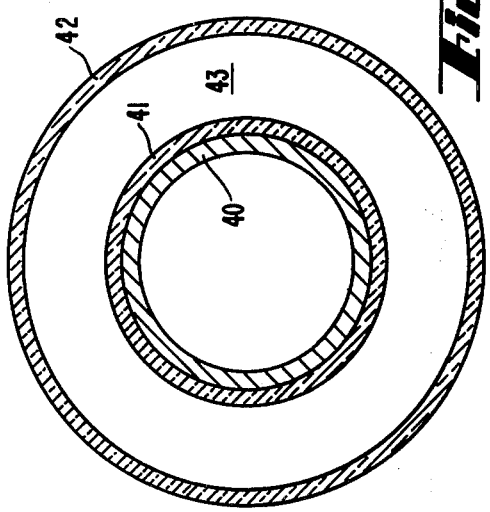
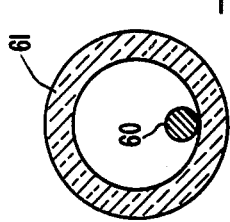
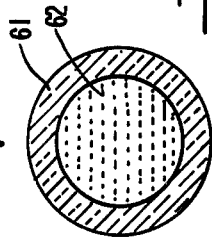
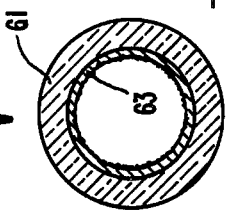
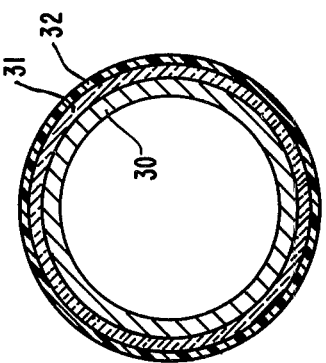
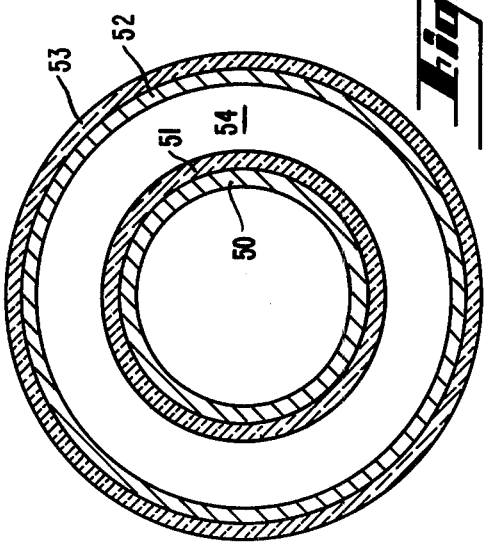

METHOD FOR FORMING TARGETS

BACKGROUND OF THE INVENTION

The invention described herein was made at the Lawrence Livermore Laboratory, in the course of, or under Contract No. W-7405-ENG-48 between the University of California and the U.S. Department of Energy.

The invention relates to the fabrication of spherical members such as inertially imploded targets, and more particularly to apparatus and method utilizing an electrical heat pulse for producing such targets having at least one uniform layer of cryogenic material therein.

Various types of targets have been proposed, both single and multiple shell, for use in inertial confinement systems, wherein the targets are imploded by energy from lasers, electron-beams, and ion-beams. The targets which have been experimentally tested have been primarily those composed of hollow glass microspheres filled with fuel such as DT in the gaseous, liquid or solid form. While some experiments have involved targets wherein the DT is formed as a hollow shell within the glass microsphere, one of the problems of this type of target is that the shell or layer of fuel is not of uniform thickness, thereby producing results that are not as satisfactory as desired. These hollow fuel shell targets were produced by diffusion of the DT through the glass microspheres and then reducing the temperature so as to "freeze" the DT on the inner surface of the glass microspheres forming a DT shell therein. Tests have shown that while this technique resulted in producing a shell of DT within the glass microsphere, the thickness of the shell was sometimes grossly nonuniform, and efforts have been directed to developing methods for forming a more uniform shell or deposit of DT. One prior approach to this problem involved conduction cooling of the target through the target support wherein the target was secured to a cooled, thin metal fiber that provided the refrigeration whereby DT's heat of vaporization is removed causing "freezing" of the DT within the glass shell. While this approach provided improved results, the targets thus made tended to have a thicker DT layer in the area of the cooled support, and thus were not sufficiently uniform. Another approach to this problem involved heat removal through an exchange gas surrounding the glass microsphere and wherein the target was slowly spun in quasi-isothermal conditions, but the results again were found to not be as satisfactory as desired for producing a uniform DT layer or shell within the glass microsphere. Thus a need has existed in the prior art for an effective method and/or apparatus for producing uniform DT, or other cryogenic material, layers or shells on the inner surface of a containing hollow member, such as the glass microspheres used in inertial confinement targets.

Targets of this type have many applications as set forth in U.S. Pat. No. 3,723,246 to M. J. Lubin, such as providing high temperature plasma for use in linear and/or closed plasma research apparatus, such as stellarators, tokamaks, magnetic mirrors, etc. In addition, plasma produced by inertially imploded targets can be used for providing space propulsion, neutron production, physics studies, etc.

It has recently been found by work carried out at the Los Alamos Scientific Laboratory, for example, that by vaporizing and rapidly cooling cryogenic materials, such as DT, contained in a hollow spherical member, such as a glass microsphere, located within an isothermal freezing cell, a uniform layer of the cryogenic material will be formed inside the hollow spherical member. This can be accomplished, for example by the so-called light pulse method described and claimed in U.S. patent application No. Ser. No. 872,284, filed Jan. 25, 1978, in the name of J. R. Miller, assigned to the assignee of this application and also described in a paper (LA-UR-76-2353) by J. R. Miller entitled, 37 A New Method For Producing Cryogenic Laser-Fusion Targets," presented at the 18th Annual Meeting of the Plasma Physics Division of the American Physical Society, San Francisco, Calif., Nov. 15–19, 1976, wherein a target composed of a glass microballoon filled with DT is positioned in a multiple shield isothermal freezing cell and is acted on by a light pulse, such as a laser heat source, wherein sufficient energy is absorbed by the glass microballoon to vaporize the DT, and upon removal of the laser heat source the DT is quickly frozen forming a uniform layer or shell within the glass microballoon.

RELATED APPLICATION

A light pulse method and apparatus described and claimed in copending U.S. patent application Ser. No. 924,336, filed July 13, 1978, in the name of Robert L. Woerner, assigned to the assignee of this application, wherein a target composed of a hollow spherical member containing cryogenic material, such as DT, is placed in a compact non-isothermal freezing cell and is acted on by a light pulse having a wavelength that is abosrbed by the spherical member or is directly absorbed by a resonance in the DT causing vaporization of the DT, and upon removal of the light pulse the DT is quickly frozen in a uniform layer.

The above-referenced copending patent application, like the present invention, described hereinafter as the heat pulse method, utilizes the basic concept of quickly vaporizing and refreezing the cryogenic material via a compact fast thermal response freezing cell. The heat pulse method differs from the light pulse method in the way in which the vaporizing heat input is transferred to the cryogenic material such that the heat pulse method is not dependent on the optical properties of the target.

SUMMARY OF THE INVENTION

The present invention is directed to a heat pulse method and apparatus for producing at least one substantially uniform frozen layer of cryogenic materials, such as DT, on the inside of hollow spherical members, such as those used in laser targets, where the spherical member is contained in a non-isothermal freezing cell filled with cryogenic heat exchange gas. The method basically consists of heating the cryogenic material to a temperature $T \gtrsim$ the cryogenic materials liquification point, and quickly recooling the materials to a temperature $T \gtrsim$ the solidification point of the cryogenic materials. The method involves the use of an electrically generated heat pulse, or other heating means, which warms the freezing cell thus warming the heat exchange gas, such as He; the gas in turn warming the target thus vaporizing the DT therein. In this method, the freezing cell has a fast thermal response and the heat exchange gas is quickly cooled causing quick cooling of the target and freezing of the DT so as to form a uniform layer or shell of frozen DT within the target. The heat pulse method is directly applicable to spherical members (shells) with opaque coatings and to shells on the inside of multilayer spherical targets.

The heat pulse method of this invention, in addition to using a non-isothermal freezing cell, also overcomes the optical limitations of the so-called light pulse method proposed by Miller as referenced above, which requires optical access to the target, in that the optical characteristics of the target or freezing cell are unimportant in the heat pulse method.

Therefore, it is an object of this invention to provide a method and apparatus for producing cryogenic inertially imploded targets utilizing a non-isothermal freezing cell.

A further object of the invention is to provide a method for producing substantially uniform frozen layers of cryogenic materials on the inside surface of spherical members.

Another object of the invention is to provide a method and apparatus for uniformally forming a layer of DT on the inner surface of a hollow spherical member such as those used in targets for implosion by lasers, electron beams, etc.

Another object of the invention is to form a uniform layer of frozen DT on the inner surface of a spherical shell by heating the DT in the shell to a temperature $\gtrsim$ the liquification point of the DT and rapidly recooling the DT to a temperature $\gtrsim$ the solidification point thereof.

Another object of the invention is to provide a method for forming a uniform layer of cryogenic material on the inner surface of a shell containing such material by heating the material via heating a surrounding cryogenic heat exchange gas, and rapdily cooling the thus heated material.

Another object of the invention is to provide a method for vaporizing the rapdily cooling cryogenic material within a hollow spherical member thereby forming a uniform layer of such material on the inner surface of the member.

Other objects of the invention will become readily apparent from the following description and accompanying drawings.

BRIEF DESCRIPTION OF THE DRAWINGS

FIGS. 2–5 illustrate exemplary embodiments of targets in which the present invention forms uniform cryogenic material layers or shells; and FIGS. 6a–6c illustrate the layer forming process of this invention.

DETAILED DESCRIPTION OF BEST MODE CONTEMPLATED

Figure 1:
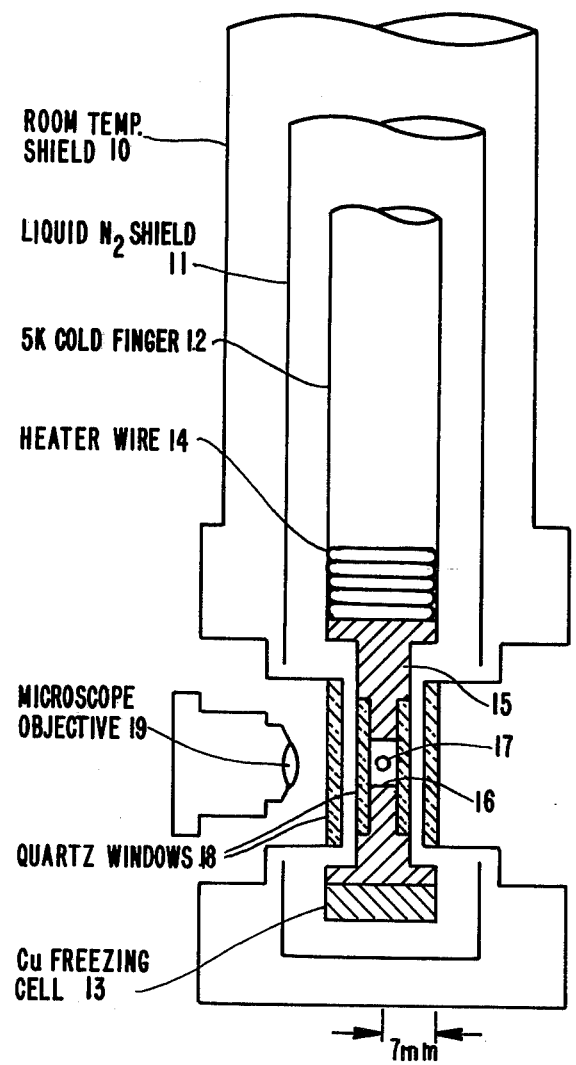
FIG. 1 illustrates a freezing cell made in accordance with the present invention.

The invention is directed to a method and apparatus for cryoinduced uniform deposition of cryogenic material, such as deuterium-tritium (DT) mixtures, inside hollow spherical members, such as inertial confinement targets. The method basically involves raising the temperature of cryogenic material contained in a hollow spherical member to a temperature $T \gtrsim$ the liquification point of the material, and quickly recooling the thus heated material to a temperature $\gtrsim$ the solidification point of the material, thereby forming a uniform layer of the material within the spherical member. While the description set forth hereinafter is directed to DT as the cryogenic material, uniform layers of other cryogenic material such as hydrogen, neon, and nitrogen, ammonia, and methane can also be produced by the method and apparatus of this invention. Also, it is pointed out that the invention, described in detail hereinafter, but generally referred to as the "heat pulse method," does not require optical access to the spherical member and is not restricted to producing a frozen uniform layer of material on only the innermost surface of a multishell laser target, for example, but uniform layers can be formed, if desired on the inner surface of a radially located outer shell or on the inner surface of two or more shells containing the cryogenic material. In addition, the heat pulse method of this invention is directly applicable to shells or hollow spherical members having opaque coatings since no optical access to the target or spherical member is required. The apparatus is compact, non-isothermal, and is adaptable to a conventional inertial confinement target chamber or conventional plasma generation chamber and has a fast thermal response.

Future approaches to inertial confinement fusion will utilize targets with a substantially uniform layer of fusion fuel, such as DT, frozen on the inside of the target. This requires that: (1) the temperature of the target ambient medium be kept at substantially less than 10° K. and (2) the DT be deposited in a substantially uniform thickness within the target shell. A non-isothermal freezing cell is used to form and hold the DT layer on the inner surface of the target prior to target implosion, this provides significant advantages over the use of an isothermal freezing cell.

Targets composed of DT filled glass microballoons or microspheres are produced, for example, by diffusion of DT gas through the glass and cooling of the target to retain the DT with the microsphere. A hollow microsphere contains DT in frozen form at, say $T \lesssim 5°$ K. Upon optical analysis, the DT in such filled microspheres appears as nonuniform lumps with the microsphere. The freezing cell is filled with a medium, such as He, surrounding the target and maintained at a temperature $T \lesssim 5°$ K. It has been found that the DT lumps are vaporized by use of a light pulse method described and claimed in the above-referenced applications wherein a light pulse incident along a line passes through the target, the light having a wavelength that is only negligibly absorbed by the He gas of the freezing cell and the DT is heated or vaporized by the light being absorbed by the glass shell sufficient to heat the DT, or of a wavelength such that it is directly absorbed by a resonance in the DT without heating the glass. When the light source is blocked, the DT gas rapidly recondenses to a uniform thickness upon the inner surface of the glass shell, by action of the low temperature He in the freezing cell. While the light pulse methods are effective for producing a uniform layer of DT within the glass microsphere, optical access to the target or spherical hollow shell containing the DT is required, thereby limiting the types of targets within which uniform layers of DT can be formed.

However, unlike the light pulse method, the "heat pulse" method of the present invention does not require optical access to the spherical shell or member which contains the DT, but involves heating the freezing cell sufficiently to heat the target and vaporize the nonuniform lumps of DT within the microsphere, this being done by passing an electrical current pulse through a heat wire near the top of the freezing cell, as shown in FIG. 1, and described hereinafter, which warms the freezing cell to a temperature $T \gtrsim 25°$–$40°$ K. The DT lumps are vaporized by heat conduction through the microsphere. Upon cutting off the heating pulse, the freezing cell has sufficiently quick response to freeze the DT so as to form a uniform layer thereof within the microsphere, as illustrated by the FIG. 2 target. If the pressure of the He gas in the freezing cell is sufficiently high (pressure of $100\mu$ to $700\mu$) and if the freezing cell is cooled to $T \approx 5°$ K. sufficiently quickly (time of 3 sec. to 7 sec.), the DT gas in the microsphere will quickly refreeze in a substantially uniform layer inside of the microsphere. However, while this is the overall time frame of the cell, the DT passes from gas through the liquid phase to a solid in 5 to 20 mil sec. If the He pressure is too low, or if the freezing cell is cooled too slowly, experiments have shown that the DT tends to freeze nonuniformly (unacceptable).

Successful tests have been carried out using the heat pulse method of this invention which involved optical interference patterns of the microsphere of the nonuniform frozen DT prior to application of the heat pulse, in the vaporized condition as the result of the heat pulse, and after being rapidly cooling or refrozen, clearly illustrating that a uniform layer of DT is formed within the glass microsphere.

Referring now to FIG. 1 an embodiment of the non-isothermal freezing cell of this invention is illustrated which is readily adaptable to a target chamber. This embodiment requires only a vacuum shield and a low temperature shield (maintained at $T \sim 5°$ K.) to maintain sufficient temperature uniformity over the region where the target is located. The distance from the center of the freezing cell to the exterior of the window in the room temperature vacuum shield is only 7 mm, for example, and the embodiment utilizes a simple electrical heating element or wire to produce the heat pulse. As shown, the dewar and freezing cell of FIG. 1 comprise a room temperature vacuum jacket or shield 10; a liquid $N_2$ radiation jacket or shield 11 coaxially within shield 11; and freezing cell assembly composed of a 5° K. cold finger or refrigerator 12 having a Cu freezing cell 13 secured to the lower end or cold tip of cold finger 12, with a heater wire or coil 24 about the central section; cold finger 12 also having a reduced diameter section 15 and freezing cell 13 in which is a chamber 16 containing a target 17. Quartz windows 18 (only four shown) are mounted in vacuum shield 10 and reduced diameter section 15 of cold finger 12, with chamber 16 being filled with He at a pressure of $100\mu$ to $700\mu$, or other suitable heat transfer gas. A microscope objective 19 is positioned adjacent the window 18 in vacuum shield 10 along an axis through chamber 16 for diagnostic purposes.

The target 17 is suspended within chamber 16, for example, between two 500Å thick parylene films which are sandwiched between two copper washers as known in the art, and is mounted in the center of chamber 16 of the freezing cell and the cell filled wtih $500\mu$ of He gas. The quartz windows 18 are epoxied to stainless steel inserts and provide optical access. The windows 18 in the room temperature vacuum shield 10 protrude through the liquid $N_2$ radiation shield 11 such that the distance from the center of the cell chamber 16 to the outside surface of the exterior windows 18 in shield 10 is only 7 mm.

The compact non-isothermal apparatus (freezing cell and dewar) illustrated in FIG. 1 provide advantages in that since the apparatus must be removed from around the target before imploding the target it is advantageous for it to be small which permits rapid removal with minimum disturbance.

In operation of the FIG. 1 device with a target 17, such as a DT filled glass microsphere, positioned in chamber 16 by support means, not shown, and cooled to a temperature of $T \approx 5°$ K. by the He, an electrical current pulse from an electrical source, not shown, is passed through heater coil 14 generating a heat pulse which warms the freezing cell and He to $T \approx 20°$ K. The He in turn warms the glass shell or microsphere and the DT lumps are thus vaporized by heat conduction through the glass shell, whereafter the He gas is rapidly recooled in the time frame described above, by the freezing cell to $T \approx 5°$ K. causing the DT to freeze in a substantially uniform layer. Thus, for a simple DT filled glass microsphere, a target such as illustrated in FIG. 2 is formed by the present invention wherein a uniform layer or shell 20 of frozen DT is formed on the inner surface of a glass microsphere 21.

By way of example, with a glass microsphere having an outer diameter of $94\mu$ and wall thickness of $3.8\mu$ containing 21.5 mg/cc DT a substantially uniform layer of frozen DT having a thickness of $1.1\mu$ will be formed on the inner surface of the glass shell using the above-described method.

FIG. 3 illustrates an embodiment of a target fabricated by the present invention wherein a uniform layer or shell 30 of DT is formed on the inner surface of a hollow sphere 31, such as glass, having an opaque coating 32, made of beryllium, on the other surface of sphere 31.

FIG. 4 illustrates an embodiment of a target that can be fabricated by the present invention and is similar to FIG. 1 except it is of the multiple shell type composed, for example, of a layer 40 of DT, a first shell 41 of glass, and an outer shell 42 of glass forming a space 43 therebetween which can be evacuated or filled with an appropriate gas, depending on the design of the target. While not shown appropriate support means for shell 41 is provided.

FIG. 5 illustrates a target fabricatable by the invention and similar to FIG. 4 except that a second layer of DT is formed on the inner surface of the outer shell, thus producing a multiple DT fuel layer. The target consists, for example, of an inner layer 50 of DT, a shell 51, such as glass, a second or outer layer 52 of DT, and an outer shell 53, such as glass. In this embodiment a space 54 between layer 52 and shell 51 would not be evacuated or gas filled.

FIGS. 6a–6c clearly illustrate the results of the present invention wherein the target initially contains a lump 60 of DT, or other materials, within a shell 61 (see FIG. 6a) whereupon heating of the target causes the material of lump 60 to vaporize as indicated at 62 in FIG. 6b, and upon rapid cooling, the material is formed into a uniform layer 63 as illustrated in FIG. 6c.

It is thus seen that unlike the light pulse method the heat pulse method of this invention does not require optical access to the spherical shell or target to vaporize the cryogenic material (DT, $H_2$, Ne, $N_2$, $CH_4$, $NH_3$ etc.) therein although the apparatus illustrated in FIG. 1 is compatible with either method. Also, the heat pulse method of this invention is directly applicable to shells with opaque coatings, as in FIG. 3, to shells of multilayered or multishell spherical targets, as in FIG. 4, and to intermediate or multiple layers of frozen cryogenic material in multiple shelled targets, as in FIG. 5. Accordingly, the present invention provides an effective method and apparatus for forming at least one substantially uniform layer of cryogenic material, such as DT, inside at least one hollow spherical member, such as a glass microsphere.

While particular embodiments, parameters, and materials have been illustrated and/or described, modifications will become apparent to those skilled in the art, and it is intended to cover in the appended claims all such modifications as come within the spirit and scope of the invention.

What I claim is:

1. A method for producing at least one substantially uniform frozen layer of cryogenic material on the inside of a spherical member composed of at least one hollow shell and containing the cryogenic material, comprising the steps of: applying a short pulse of heat to warm a contained quantity of cryogenic heat exchange medium at a pressure of $100\mu$ to $700\mu$ within which the spherical member is positioned; causing heating of the cryogenic material via heat conduction through the spherical member to a temperature $T \gtrsim$ the liquification point of the cryogenic material; and recooling the material through its liquid phase in a time frame of 5 ms to 20 ms and to a temperature $T \lesssim$ the solidification point of the cryogenic material causing said cryogenic materials to form a substantially uniform frozen layer within the spherical member.

2. The method defined in claim 1, wherein the step of applying the short pulse of heat is carried out by directing electrical current through a heating coil located adjacent the contained quantity of cryogenic heat exchange medium causing heating of said medium which heats the spherical member.

3. The method defined in claim 1, additionally including the steps of filling at least one hollow shell of the spherical member with the cryogenic material, positioning the spherical member in the contained quantity of cryogenic heat exchange medium, and cooling the medium to a temperature $T \gtrsim$ the solidification point of the cryogenic material prior to the step of applying the pulse of heat to the contained cryogenic heat exchange medium.

4. The method defined in claim 3, additionally including the steps of selecting the cryogenic material to fill the hollow shell from the group consisting of DT, $H_2$, Ne, $CH_4$, $NH_3$, and $N_2$, and utilizing He gas as the cryogenic heat exchange medium.

5. The method defined in claim 1, additionally including the steps of containing the cryogenic heat exchange medium in a freezing cell assembly, and utilizing He gas as the heat exchange medium.

6. The method defined in claim 5, additionally including the step of positioning an electrical heating coil about the freezing cell assembly adjacent the cryogenic heat exchange gas such that passing a pulse of electrical current through the heating coil produces the short pulse of heat which warms the freezing cell assembly and heat exchange gas causing heating of the spherical member and the cryogenic material therein.

7. The method defined in claim 1, wherein the step of recooling is carried out by the cryogenic heat exchange medium being contained in a freezing cell assembly having a temperature $T \sim 5°$ K.

* * * * *